United States Patent
Kunkel

[11] Patent Number: 5,554,922
[45] Date of Patent: Sep. 10, 1996

[54] APPARATUS FOR THE CONVERSION OF PRESSURE FLUCTUATIONS PREVAILING IN FLUID SYSTEMS INTO ELECTRICAL ENERGY

[75] Inventor: Horst Kunkel, Stuttgart, Germany

[73] Assignee: Hansa Metallwerke AG, Stuttgart, Germany

[21] Appl. No.: 380,756

[22] Filed: Jan. 31, 1995

[30] Foreign Application Priority Data

Feb. 2, 1994 [DE] Germany ................ 44 03 180.7

[51] Int. Cl.$^6$ ................................................ H02K 35/00
[52] U.S. Cl. ........................... 322/3; 310/339; 290/4 D; 290/54
[58] Field of Search ....................... 322/3; 310/338, 310/339, 26; 290/4 D, 43, 54

[56] References Cited

U.S. PATENT DOCUMENTS

| | | | |
|---|---|---|---|
| 3,247,406 | 4/1966 | Toësa | 310/15 |
| 3,766,399 | 10/1973 | Demetrescu | 290/40 |
| 3,906,960 | 9/1975 | Lehr | 128/419 |
| 4,645,965 | 2/1987 | Paganelli | 310/338 |
| 5,203,172 | 4/1993 | Simpson et al. | 60/545 |
| 5,347,186 | 9/1994 | Konotchick | 310/17 |
| 5,362,987 | 11/1994 | Cassaday et al. | 290/54 |

FOREIGN PATENT DOCUMENTS

| | | |
|---|---|---|
| 2470854 | 6/1981 | France . |
| 2355728 | 5/1975 | Germany . |
| 2831742 | 2/1980 | Germany . |
| WO81/00274 | 2/1981 | WIPO . |

*Primary Examiner*—Steven L. Stephan
*Assistant Examiner*—Nicholas Ponomarenko
*Attorney, Agent, or Firm*—Lowe, Price, LeBlanc & Becker

[57] ABSTRACT

An apparatus for the conversion of pressure fluctuations prevailing in fluid systems into electrical energy includes in a casing (1) a first chamber (4) which may be connected to a fluid system and is limited on one side by a movable wall, for example a membrane (3). The movable wall is mechanically linked to an apparatus (6), e.g. a piezoelectric converter, which converts the mechanical energy made available by the motion of the movable wall (3) into electrical energy (FIG. 1).

16 Claims, 2 Drawing Sheets

APPARATUS FOR THE CONVERSION OF PRESSURE FLUCTUATIONS PREVAILING IN FLUID SYSTEMS INTO ELECTRICAL ENERGY

TECHNICAL FIELD

The invention concerns an apparatus for the conversion of pressure fluctuations prevailing in fluid systems into electrical energy.

BACKGROUND OF THE INVENTION

In recent times electrically controlled, and particularly non-contact controlled appliances have been increasingly used in sanitary arrangements. In this context ever greater efforts are being made to drive these appliances independently of the mains voltage, that is, to provide them with a self-sufficient power source. This not only reduces the cost of the electrical appliance remarkably, but also allows much easier assembly or upgrading where necessary and is not subject to any psychological problems with the user who frequently fears any mains connections in wet areas and thus prefers to forego electrically operated appliances. If the electrically operated appliance is equipped only with a battery or an accumulator, then either the battery has to be changed at regular intervals or the accumulator must be charged up again. If the charge on the battery or accumulator is approaching its end, there is the risk that the appliance will not function properly.

Thus there have been various attempts made in the past to insert regenerative power sources, which obtain their energy from the surroundings in which the sanitary appliance is placed, for recharging an accumulator inside the sanitary appliance or even for directly driving it. Thus for example, the use was proposed of solar cells which are, though, not particularly effective in the frequently not very strongly illuminated spaces in which sanitary appliances are used. They therefore require relatively large surfaces. With any dirtying which might be feared in any such areas, they lose still more of their efficacy. In addition, charging the accumulator in the relatively long periods of darkness is not possible.

It is also known to use Peltier elements for supply of power to sanitary appliances which can, though, only be effective if warm water is available and it is also flowing. If warm water does not flow through the sanitary appliance for a long time, the Peltier elements are no longer adequate as a source of power.

Similar problems arise with mechanical turbines which are set in rotational motion by the flowing water and which drive an electrical generator. An apparatus of this type also presupposes a relatively frequent water flow; when the sanitary appliance stops for a long period, charging of the accumulator does not take place.

SUMMARY OF THE INVENTION

It is the task of the present invention to create an apparatus of the type specified at the start which produces an electrical voltage even in unfavourable conditions of illumination, without a reservoir of heat or any flow within the fluid system.

This task is resolved according to the invention in that the apparatus includes:

a) a casing b) at least one chamber formed in the casing which may be linked to a fluid system and which is limited on the one side by a wall which may be moved back and forth under the influence of the pressure prevailing in the fluid system;

c) at least one apparatus which is connected to the movable wall and which converts the mechanical energy transmitted by this into electrical energy.

The invention makes use of the knowledge that pressure fluctuations are present in all fluid systems and certainly always in domestic plumbing systems. The more taps there are attached to the fluid system, the stronger are these pressure fluctuations. With an apparatus according to the invention, the energy which is available in these pressure fluctuations is first of all converted into mechanical and then electrical energy. Pressure fluctuations of this type are present by day and by night, with and without illumination and in cold and hot water systems. The apparatus according to the invention thus operates uninterruptedly and can charge an accumulator, e.g a sanitary appliance for 24 hours per day.

The apparatus c) can be a piezoelectric converter as is usually offered for sale in the trade. The normal purpose for which a piezoelectric converter of this type, as is normally found in the trade, is used is, though, reversed: application of an external voltage should give rise to a mechanical motion. With the present invention by contrast, the mechanical motion is provided in advance; a voltage accordingly arises at the electrical output terminals of the piezoelectric converter which can then be further processed.

Alternatively, the apparatus c) can include a coil which interacts with a permanent magnet that can move relative to it. The conversion of mechanical energy into electrical energy takes place in this case by normal induction.

On geometrical grounds, it is useful if the coil is a hollow coil inside which the permanent magnet is introduced so as to be movable.

In this connection it is preferred that the permanent magnet is joined to the movable wall and the coil is stationary. In this manner the mechanical parts which must be set in motion by the pressure fluctuations in the fluid system remain relatively small.

In one implementation of the invention, only one chamber is provided in the casing which may be joined to a fluid system and the component which forms the movable wall limits a further chamber on the side opposite the first chamber which is in contact with the external atmosphere. This implementation form of the invention thus uses the pressure difference between the fluid system and the external atmosphere.

In this context it is recommended that the apparatus c) be arranged in the second chamber where it is removed from the direct influence of the fluid system (but not of course the transmitted pressure fluctuations) e.g it is not "in the wet".

Very frequently there are two fluid systems available which are separated from one another and which each show separate pressure fluctuations. In sanitary arrangements this relates to the cold and hot water plumbing systems. In this case, an implementation of the invention is recommended in which two chambers are provided in the casing which are joined to two different fluid systems and where the movable walls belonging to the two chambers are linked to one another in such a way that they move in unison according to the difference in the pressures prevailing in the two fluid systems. The pressure differences thus obtained can be much greater than those which are shown by a single fluid system with respect to the external atmosphere; the yield of electrical energy is correspondingly greater.

A geometrically particularly small implementation example can be formed in this case in which both movable walls are formed on opposites sides of the same component which is arranged roughly in the middle of the casing and that two apparatuses c) are provided each of which is arranged in the two chambers which may be linked to the fluid systems.

A possible alternative to this is the form of the invention in which both the movable walls are formed on spatially separated components which are mechanically joined to one another and between which an apparatus c) is arranged, This implementation example has the advantage that the apparatus c) can be accommodated in a "dry" space or at least one which cannot be reached directly by the fluid system between the two movable walls.

If the movable walls do not have sufficient inherent elasticity or cannot be returned by another means after a deflection it is recommended that the movable wall be impacted by a return spring.

The movable wall can be formed on a membrane whose external perimeter is fixed to the casing, such a membrane is very good value and takes up relatively little space.

Alternatively, the movable wall can be formed on a piston which may be moved linearly inside the casing. A piston of this type does indeed take up somewhat more room than a membrane, but is though somewhat less endangered by aging.

It will generally be useful if the apparatus according to the invention includes an accumulator for storage of the electrical energy obtained and an electronic switching circuit which converts the electrical energy yielded directly by the apparatus linked to the movable wall into a form which may be stored in the accumulator. As a rule, the directly obtained energy is of course not directly usable, as its temporal onset is too irregular and the output obtained is not sufficient for many application purposes without storage.

A major area of use for the invention consists of the use of such an apparatus for the supply of power to an electrically operated appliance, particularly to an electrically operated sanitary appliance whereby the fluid system or systems is (are) formed in each case by a domestic plumbing system.

BRIEF DESCRIPTION OF THE DRAWINGS

Implementation examples of the invention are further elucidated hereafter by means of the illustration; the figures show the following

DESCRIPTION OF THE PREFERRED EMBODIMENTS

Figure 1:
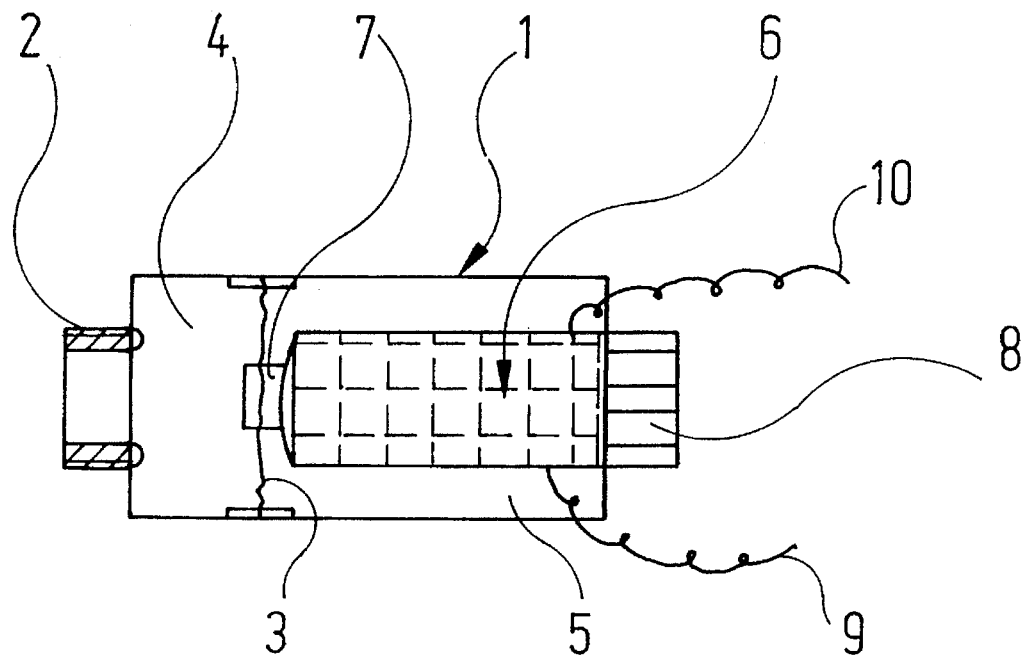
FIG. 1: an axial section through a first implementation example of an apparatus for the conversion of pressure fluctuations in piping systems into electrical energy.

The implementation example of an apparatus for the conversion of pressure fluctuations in piping systems into electrical energy represented in FIG. 1 includes a casing 1 which is provided with a connecting piece 2. A major area of use for the invention consists of the use of such an apparatus for the supply of power to an electrically operated sanitary appliance whereby the fluid system or systems is (are) formed in each case by a domestic plumbing system.

The connecting piece 2 serves for the connection of the apparatus to a water pipe e.g. domestic piping, in which pressure fluctuations prevail even with stationary water flow.

The interior of the casing 1 is subdivided into two chambers 4 and 5 by a flexible membrane 3. The membrane 3 is tightly fixed at its outer perimeter to the inner surface of the wall of the casing 1.

The left chamber 4 in FIG. 1 is filled with water from the connected water pipe via the connecting piece 2 and transmits the pressure fluctuations prevailing there to the membrane 3.

A piezoelectric converter 6 is fixed in the right chamber 5 of the casing 1 in FIG. 1. Piezoelectric converters 6 of this type are usually offered for sale in the trade and are normally used so as to give rise to a linear movement of a output arm on application of an external voltage. In the present case the piezoelectric converter 6 is operated in a reverse manner: by mechanical movement of its output arm 7 an electrical voltage is produced. For this the output arm 7 of the piezoelectric converter 6 is fixed in the middle area of the membrane 3.

The chamber 5 of casing 1 is furthermore connected to the surrounding atmosphere via a ventilation opening 8.

The described apparatus works as follows:

If the connecting piece 2 is connected in the manner already indicated above to a water pipe in which pressure fluctuations prevail, these pressure fluctuations are transmitted via the water which passes though into the chamber 4 of the casing 1 to the membrane 3. This is thereby set into an oscillation which follows the pressure pulses in the chamber 4. The oscillations of the membrane 3 are transferred to the output arm 7 of the piezoelectric converter which then executes a movement under the influence of the pressure fluctuations in the chamber 4. The movements of the output arm 7 of the piezoelectric converter, which in the present case is used as an input arm, results in an electrical voltage which can be measured at the electric terminals 9, 10 of the piezoelectric converter 6 and used for storage in an accumulator or similar by suitable electronics which are not the object of the present invention.

Figure 2:
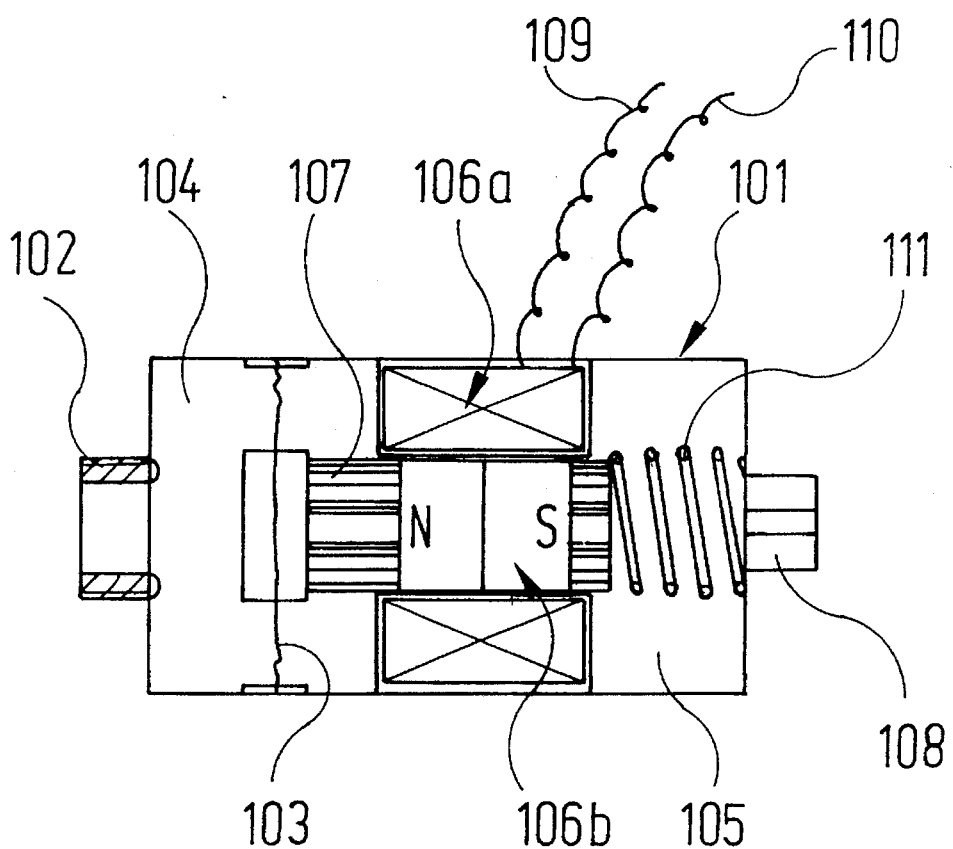
FIG. 2: an axial section through a second implementation example of such an apparatus.

The implementation example of the invention according to FIG. 2 is very similar to that of FIG. 1; corresponding parts are therefore indicated by the same reference numbers plus 100. There is again a casing 101, which is subdivided into two chambers 104 and 105 by a flexible membrane 103 which is fixed at its outer perimeter. The chamber 104 is in contact via the connecting piece 102 with a water pipe in which pressure fluctuations arise.

A hollow coil 106a is fixed in the "dry" chamber 105 of the casing 101. A permanent magnet 106b is introduced into the hollow coil 106a so as to be movable and is joined and fixed to the membrane 103 by a sort of plunger 107. Between the end of the plunger 107 or of the permanent magnet 106b which is turned away from the membrane 103 and thus is the right end in FIG. 2 and the right boundary wall of the chamber 105 in FIG. 2 a compression spring 111 is fitted in which presses the plunger 107 and with it the permanent magnet 106b in the direction of the membrane 103.

The chamber 105 is again connected to the surrounding atmosphere via a ventilation opening 108.

The mode of functioning of the implementation example represented in FIG. 2 is as follows:

When pressure fluctuations arise in the system of pipes attached to the connecting piece 102 and with it also in the chamber 104 of the casing 101 these are transmitted by the membrane 103 to the permanent magnet 106b. This consequently carries out linear movements back and forth inside the hollow coil 106a. An electrical voltage arises through an induction effect at the electrical connection terminals 109, 110 of the hollow coil which is again fed in for electronic reprocessing and finally for storage in an accumulator.

The implementation examples described above according to FIGS. 1 and 2 are used in those places where only one fluid system is available which is affected by pressure fluctuations. In many cases, particularly in sanitary arrangements, there are, however, two fluid systems of this type available e.g. the cold and hot water system in a home. The implementation examples according to FIGS. 3 and 4 are intended for applications of this type.

Figure 3:
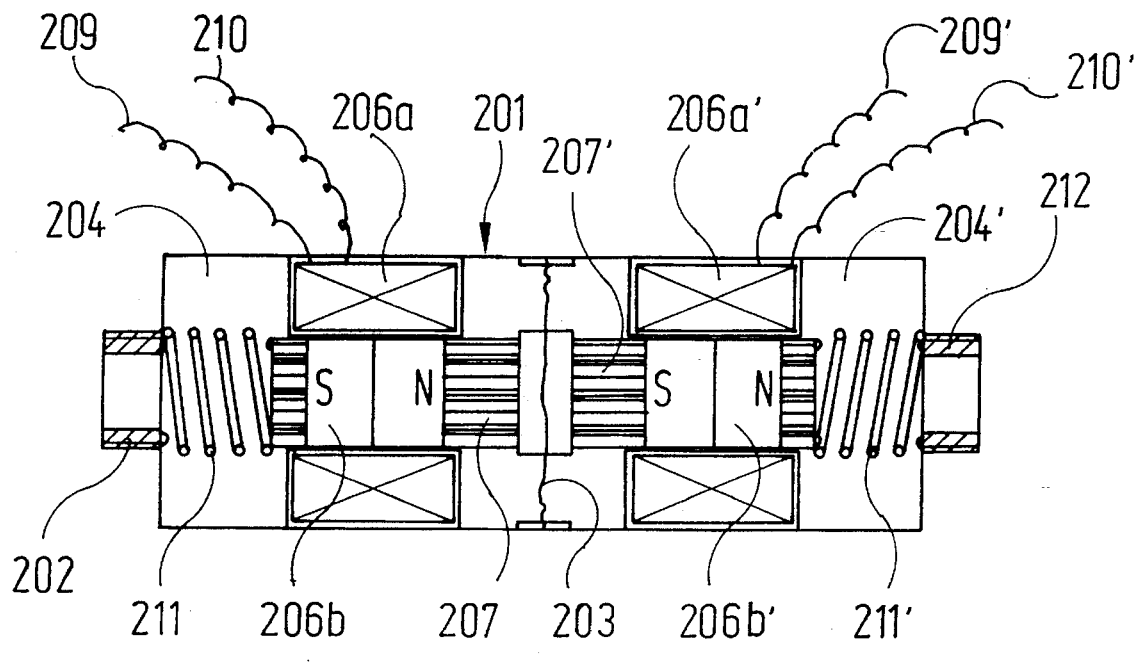
FIG. 3: an axial section through a third implementation example of such an apparatus.
Figure 4:
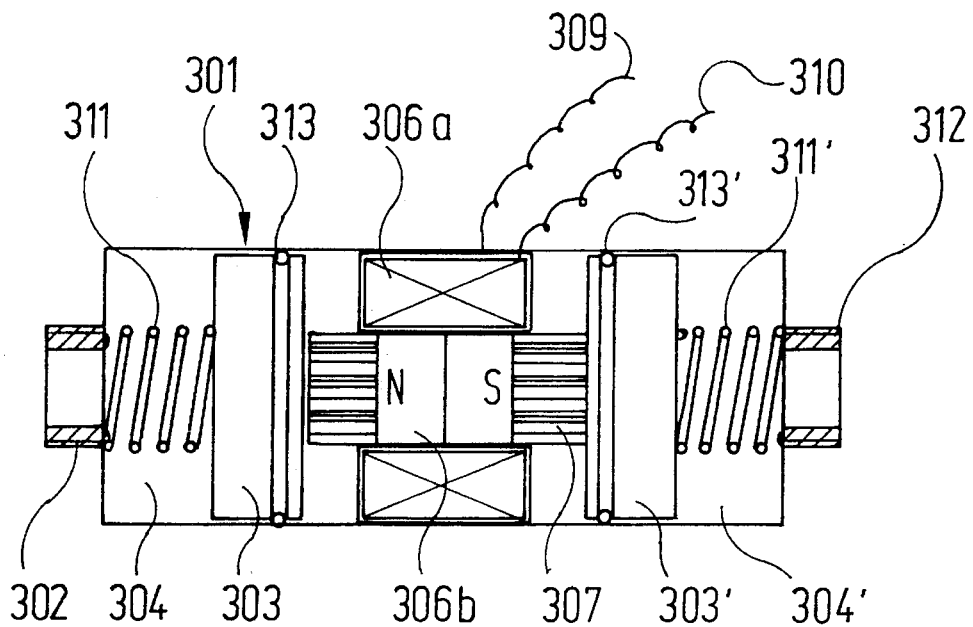
FIG. 4: an axial section through a fourth implementation example of such an apparatus.

In the implementation example of FIG. 3 parts which correspond to those of FIG. 1 are indicated by the same reference numbers plus 200.

The apparatus represented in FIG. 3 for conversion of pressure fluctuations into electrical energy again includes a casing 201, which is subdivided into two chambers 204 and 204' by a flexible membrane 203. The membrane 203 thus lies symmetrically in the middle of the casing 201.

The chamber 204 which lies on the left in FIG. 3 again has a connecting piece 202 which is joined to one of the two available fluid systems, for example with the warm water plumbing system in a house. A hollow coil 206a is arranged inside the chamber 204 and thus—unlike the implementation example of FIG. 2—in the area which can be reached by the fluid, i.e. the wet area. In it, a permanent magnet 206b is introduced so as to be movable and linked and fixed to the membrane 203 by a plunger 207. A compression spring 211 is fitted in between the left boundary wall of the chamber 204 in FIG. 3 and the left end of the plunger 207 or permanent magnet 206b and presses the latter to the right, that is in the direction of the membrane 203.

The chamber 204' of the implementation example of FIG. 3 is formed—unlike the chambers 5 and 105 of the implementation examples according to FIGS. 1 and 2—completely symmetrical to chamber 204 just like all the components put in to this chamber 204'. Inside the chamber 204' are likewise a hollow coil 206a', a permanent magnet 206b' which has been introduced in to it, a plunger 207' which links the permanent magnet 206b' to the membrane 203 and a compression spring 211' which is fitted in between the right boundary wall of the chamber 204' in FIG. 3 and the right end of the plunger 207' or permanent magnet 206b' in FIG. 3 and presses the permanent magnet 206b' to the left, that is in the direction of the membrane 203.

The chamber 204' is provided with its own connecting piece 212 which is joined to the second of the two available fluid systems, thus for example with the cold water plumbing system in a house.

The functioning of the implementation example of FIG. 3 is as follows:

After connection of the apparatus to both fluid systems the momentary difference in the pressures in both the fluid systems at any moment acts on the membrane 203. This difference can be significantly greater than the pressure fluctuations which arise in an individual fluid system. Under the influence of the pressure differential the membrane 203 moves and with it the permanent magnets 206b and 206b' move in the hollow coils 206a and 206a'. Electrical voltages arise through induction at the connection terminals 209, 210 and 209', 210' of the hollow coils 206a and 206a' which can again be fed in for electronic processing and storage in an accumulator.

In the following description of the implementation example represented in FIG. 4 the same reference numbers but with the addition of 300 are again used for parts which correspond to those of FIG. 1.

The casing 301 is provided with a first connecting piece 302 at its end which is on the left in FIG. 4 and with a second connecting piece 312 at its end which is on the right in FIG. 4. In the middle of the casing 301 a stationary hollow coil 306a is fixed. Inside the hollow coil 306a a permanent magnet 306b is introduced so as to be movable and joined to two pistons 303 and 303' by a plunger 307 which protrudes from the permanent magnet 306b at both ends. The pistons 303 and 303' are sealed to the casing 301 in each case by means of a seal 313 or 313' which has been inserted into the surface of the casing. A compression spring 311, 311' is fitted between the rear end of each of the pistons 303 and 303' and the adjacent wall of the casing which attempts to press the relevant pistons 303 and 303' in the direction of the centre of the casing that is to say of the hollow coil 306a.

The mode of functioning of the implementation example represented in FIG. 4 is as follows:

After each of the connecting pieces 302 and 312 is connected to one of the fluid systems, for example to the cold and hot water plumbing systems of a house, the spaces 304 and 304' which are at the rear of the pistons 303 and 303' fill up with the corresponding fluid. The pressure in chamber 304 tries to push the piston 303 to the right; the pressure in chamber 304' tries to push the piston 303' to the left. On account of the rigid link between the two pistons 303 and 303' via the plunger 307 the unit formed from the two pistons 303, 303', the plunger 307 and the permanent magnet 306b moves under the influence of the difference in pressures which prevail in the two chambers 304 and 304'. In this manner a to and fro movement of the permanent magnet 306b inside the hollow coil 306a again arises whereby a voltage is induced in the hollow coil 306a. This may be measured at the electrical terminals 309, 310 and be fed in for electronic reprocessing for storage in an accumulator.

I claim:

1. A system for the conversion of pressure fluctuations prevailing in fluid distribution piping systems into electrical energy, characterized in that it includes:

a) a casing (1; 101; 201; 301);

b) at least one chamber (4; 104; 204; 304) formed in the casing (1; 101; 201; 301) which may be linked to a fluid system and which is limited on the one side by a wall (3; 103; 203; 303, 303') which may be moved back and forth under the influence of the pressure prevailing in the fluid system;

c) at least one apparatus (6; 106a, 106b; 206a, 206b, 206a', 206b'; 306a, 306b) which is connected to the movable wall (3; 103; 203; 303, 303') and which converts the mechanical energy transmitted by this into electrical energy.

2. Apparatus according to claim 1, characterized in that the apparatus c) is a piezoelectric converter (6).

3. Apparatus according to claim 1, characterized in that the apparatus c) includes a coil (106a; 206a, 206a'; 306a) which interacts with a permanent magnet (106b; 206b, 206b'; 306b) which may be moved relative to it.

4. Apparatus according to claim 3, characterized in that the coil (106a; 206a, 206a'; 306a) is a hollow coil inside which the permanent magnet (106b; 206b, 206b'; 306b) is introduced so as to be movable.

5. Apparatus according to claim 3, characterized in that the permanent magnet (106*b*; 206*b*, 206*b*'; 306*b*) is joined to the movable wall (103; 203; 303; 303') and the coil (106*a*; 206*a*, 206*a*'; 306*a*) is stationary.

6. Apparatus according to claim 1, characterized in that only one chamber (4; 104) is provided in the casing (1; 101) which may be linked to a fluid system and that the component which forms the movable wall (3; 103) limits a further chamber (5; 105) on the side opposite the first chamber (4; 104) which is in contact with the external atmosphere.

7. Apparatus according to claim 6, characterized in that the apparatus c) is arranged in the second chamber (5; 105).

8. Apparatus according to claim 1, characterized in that two chambers (204, 204'; 304, 304') are provided in the casing (201; 301) which may be linked to two different fluid systems and that the movable walls (203; 303, 303') belonging to the two chambers (204, 204'; 304, 304') are linked to each other in such a way that they move jointly according to the difference in the pressures prevailing in the two fluid systems.

9. Apparatus according to claim 8, characterized in that both the movable walls are formed on opposite sides of the same component part (203) which is arranged roughly in the middle of the casing (201) and that two apparatuses c) are provided each of which is arranged in the two chambers (204; 204') which may be linked to the fluid systems.

10. Apparatus according to claim 8, characterized in that both movable walls are formed on spatially separated components (303, 303') which are mechanically joined to one another and between which an apparatus c) is arranged.

11. Apparatus according to claim 1 characterized in that the movable wall (103, 203; 303, 303') is impacted by a return spring (111; 211, 211'; 311, 311').

12. Apparatus according to claim 1 characterized in that the movable wall is formed on a membrane 3; 103; 203) whose external perimeter is fixed to the casing (1; 101; 201).

13. Apparatus according to claim 1, characterized in that the movable wall is formed on a piston (303, 303') which may be moved linearly inside the casing (301).

14. Apparatus according to claim 1, characterized in that it includes an accumulator for storage of the electrical energy obtained and an electronic switching circuit which converts the electrical energy yielded directly by the apparatus (6; 106*a*, 106*b*; 206*a*, 206*b*, 206*a*', 206*b*'; 306*a*, 306*b*) linked to the movable wall into a form which may be stored in the accumulator.

15. Use of an apparatus according to claim 1 for the supply of power to an electrically operated appliance.

16. Use of an apparatus according to claim 15 for the supply of power to an electrically operated sanitary appliance whereby the fluid system or systems is (are) formed in each case by a domestic plumbing system.

* * * * *